Figures 1, 2:
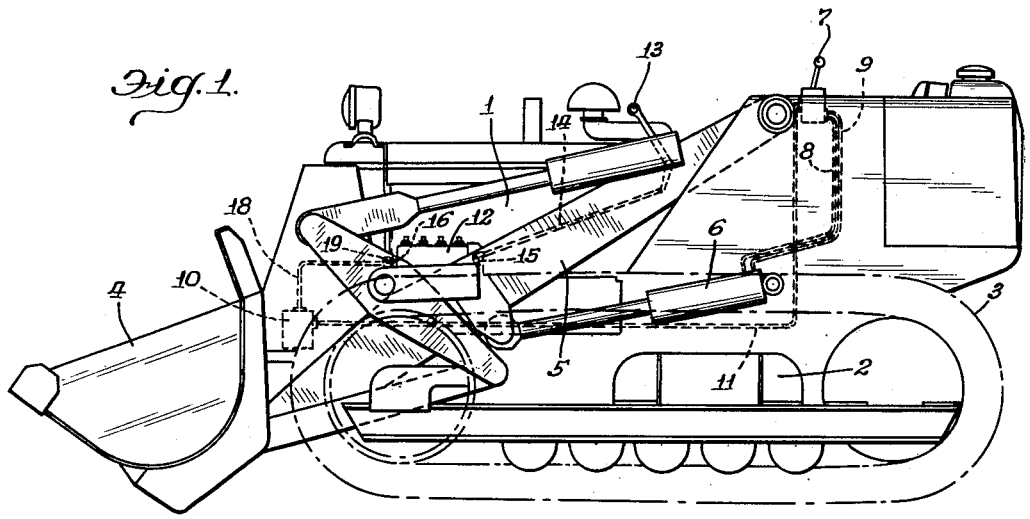

Sept. 15, 1964

J. F. ZISKAL 3,148,790

LOAD RESPONSIVE FUEL CONTROL MEANS

Filed Aug. 21, 1961

INVENTOR.
Joseph F. Ziskal
BY
Atty.

3,148,790
LOAD RESPONSIVE FUEL CONTROL MEANS
Joseph F. Ziskal, Sprotborough, Doncaster, England, assignor to International Harvester Company, Chicago, Ill., a corporation of New Jersey
Filed Aug. 21, 1961, Ser. No. 132,717
Claims priority, application Great Britain Jan. 6, 1961
3 Claims. (Cl. 214—140)

This invention relates to control means for power transmission systems as, for example, systems of mobile material-handling machines, wherein an internal combustion engine drives traction means, such as wheels or endless tracks, through a suitable mechanical or other transmission, and also supplies power for a hydraulic or other pressure fluid system for the operation of material-handling means, such as a shovel bucket or the like utilizing at times a high proportion of the available engine power.

The term "mobile material-handling machine" used herein includes a machine comprising a conventional tractor provided with material-handling equipment of the character referred to, and also includes excavating, digging, and loading machines which have been designed and constructed for the specific purpose of material-handling.

In mobile material-handling machines of the character referred to, the power required for the hydraulic or other pressure fluid system for the operation of the digging bucket or the like, is very high for short periods and may absorb as much as two-thirds of the developed horsepower of the engine, and during such periods the power available for traction is correspondingly reduced. If the available power output of the engine is increased to provide adequate power for traction when the power demand of the hydraulic system is high, and this increased power output of the engine is available for transmission to the traction means when the power demand of the system is low, then the transmission from the engine to the traction means has to be overdesigned which is unwanted. It is desirable, therefore, that the normal maximum output of the engine applied to the traction means should be limited to a feasible level so that the power transmission from the engine to the traction means can be appropriately designed in proper relation to the tractive ability of the machine, and that increased power output should be available only when the power demand of the hydraulic or other pressure fluid system is high.

The present invention has for its object to provide simple and effective automatic control means whereby the maximum power output of the engine may be boosted when the power demand of the hydraulic or other pressure fluid system is high, and whereby the power output applied to the transmission to the traction means when the power demand of the hydraulic or other pressure fluid system is low, is restricted to a predetermined normal power output.

As illustrated herein, the invention is shown embodied in a material-handling tractor; the engine of the tractor is connected, as indicated, to apply power to operate both the traction means of the tractor and a pump supplied hydraulic system thereon, there being a tractor-mounted tool connected in power-receiving relation to the hydraulic system to handle loads of the material. My invention consists more particularly of an improved fuel-supplying system comprising a fuel injection assembly having a control rack and extension which travel along a longitudinal reference axis for adjusting the rate of supply of fuel to the engine, operator-operated means to adjust the rack in positions from an engine-idle position to and including stopped positions of full load power output in the direction of travel of the rack, a hydraulic cylinder having a movable piston rod and communicating with the pressure fluid in the hydraulic system, the rod being controlled jointly by a piston which is exposed to the pressure fluid and by a spring, a mounting structure mounting the cylinder on the assembly in a disposition with the piston rod across the direction of travel of the rack extension and establishing an axis transverse to the longitudinal reference axis of said rack extension, and a cam portion arranged with the diameter of the cam surface tapering downwardly from a relatively enlarged end, the cam portion being carried by the piston rod and being movable thereby in a direction to be engaged by and to stop the rack, respectively, in a normal maximum power output position when the power demand of the hydraulic system becomes minimal, and in progressively increasing full load power output positions when the power demand of the hydraulic system increases due to loading on the tractor-mounted tool.

The cylinder just described has a head end opposite to the piston rod end of the cylinder, the pressure fluid of the hydraulic system being communicated through the head end of the cylinder to the piston in an opposing relation to the spring. The tapering cam portion surface is arranged with its larger diameter at that end thereof remote to the cylinder, whereby in responding to minimal hydraulic power demand the piston rod retracts the cam portion surface so that it presents its enlarged end for engagement by the rack extension.

The mounting structure described above comprises a releasable clamping means on the assembly to afford adjustment of the cylinder transversely to the direction of travel of the rack extension, whereby the normal limiting position of travel of the rack extension can be pre-selected for the normal maximum power output desired.

The invention is hereinafter described, by way of example, with reference to the accompanying diagrammatic drawings, in which:

FIGURE 1 is a diagrammatic view of a mobile material-handling machine comprising a conventional tractor fitted with a hydraulically operated shovel bucket and provided with the improved automatic control means according to the invention; and FIGURE 2 is a part-sectional perspective view illustrating one embodiment of the automatic control means as applied to the fuel injection pump assembly of a diesel engine.

In carrying the invention into effect according to one embodiment, and with reference to the accompanying diagrammatic drawings, the invention is illustrated in its application to a mobile material-handling machine comprising a conventional tractor having a diesel engine 1 from which power is transmitted through a mechanical transmission 2 to traction means, such as endless tracks 3 or drive wheels, and having material-handling means, such as a shovel bucket 4 carried by pivoted arms 5, one at each side of the machine, each arm being operated by a hydraulic ram 6 connected to a manually operable control valve 7 by conduits 8 and 9. Fluid under pressure for the operation of the hydraulic system is derived from a pump 10 driven from the engine 1 and delivering fluid under pressure to the control valve 7 through a conduit 11. The engine is provided with a fuel injection pump assembly 12 of conventional construction embodying a control rack (not shown) operable by a hand lever 13 through a link 14 and arm 15. An extension 16 of the rack projects beyond the end of the casing of the injection pump assembly 12. Usually a pre-settable stop is arranged to coact with the extension 16 to determine the maximum output position of the rack.

In accordance with the invention, automatic control means is provided comprising a pressure-responsive device 17 connected through a suitable conduit 18 with the hydraulic system on the output side of the pump 10 and a stop member 19 in the form of a cam arranged to coact with the extension 16 of the rack.

As shown in more detail in FIGURE 2, the pressure-responsive device 17 comprises a cylinder 20 fitted into an internal cylindrical casing 21 as by means of screw threads, the casing 21 having a cylindrical portion 22 of reduced diameter which is received in a clamp 23 provided on a bracket 24 adapted to be secured to the end of the casing of the injection pump assembly 12 as by means of bolts 25. A piston 26 slidable in the bore of the cylinder 20 is provided with a piston rod 27 which extends through an end bearing 28 provided with a seal 29 and carries the cam member 19 which is of tapered formation, e.g. of truncated conical form with the larger diameter at the extremity. A helical spring 30 encircling the piston rod 27 abuts a disc-like member 31 positioned against a shoulder 32 on the piston rod and normally held by the spring against a stop provided, for example, by a snap ring 33 seated in an annular recess in the wall of the cylinder 20.

The automatic control means operates in the following manner: In the position shown in FIGURE 2, the cam member 19 has its larger diameter engaging the extension 16 of the rack and is adapted to position the rack for normal maximum output suitable for traction purposes. As the power demand of the hydraulic system increases, pressure in the hydraulic system rises, and this increased pressure is transmitted through the conduit 18 into the bore of the cylinder 20 and consequently displaces the piston 26 against the action of the spring 30 which is suitably selected so that when the hydraulic system is under maximum load the member 31 abuts an internal shoulder 34 in the casing 21. As the piston 26 is displaced in response the increase of pressure in the hydraulic system, the cam member 19 is correspondingly displaced so as to present a smaller diameter thereof opposite the extension 16 of the rack, thus enabling the rack to be operated beyond the normal maximum output position to give increased output from the engine in proportion to the increased power demand of the hydraulic system. When the power demand of the hydraulic system falls and pressure in the cylinder 20 is relieved, the piston 26 and cam member 19 are returned by the action of the spring 30 and in this return movement the cam member 19 acts to return the rack extension 16 to the predetermined normal maximum output position.

Assuming that the transmission from the engine 1 to the traction means is designed on the basis that a maximum of 125 H.P. is available for traction, the control means 17 can be adapted and arranged to permit boosting of the engine output up to, e.g. 155 H.P. when the power demand of the hydraulic system is high, e.g. as much as two-thirds of the developed horsepower, so as to still leave adequate power output for effective traction. The increased power output of the engine is regulated in accordance with the load in the hydraulic system so that the power transmitted to the traction means does not at any time exceed the normal rated maximum of 125 H.P.

It is will understood that the invention is not limited to the particular embodiment hereinbefore described. For example, the invention is applicable to power transmission systems wherein the internal combustion engine drives the traction means through transmission means other than mechanical, e.g. hydraulic or electric transmission means. The system for the operation of the material-handling means may use air or a combination of oil and air as the pressure medium.

Furthermore, the cam member cooperating with the rack extension or other control member, may be of the rotary type and operated from the pressure-responsive means by a suitable linkage. The pressure-responsive device may be otherwise suitably constructed and may be suitably arranged and adapted to cooperate with the output control member of an engine, which control member may be a rack in a fuel injection pump assembly as shown and described, a throttle control of a carburetor, or a suitable member of a governor controlled mechanism as commonly utilized to regulate the power output of engines for tractors and like machines.

What is claimed is:

1. In a material-handling tractor having the engine connected to apply power to operate both the traction means of the tractor and a pump supplied hydraulic system thereon, there being a tractor-mounted tool connected in power-receiving relation to the hydraulic system to handle loads of the material, an improved fuel-supplying system comprising:

a fuel injection assembly having a control rack and extension which travel along a longitudinal reference axis for adjusting the rate of supply of fuel to the engine, operator-operated means to adjust the rack in positions from an engine-idle position to and including stopped positions in the direction of travel of the rack corresponding to full-load power output of the engine;

a hydraulic cylinder having a movable piston rod and communicating with the pressure fluid in the hydraulic system, said piston rod being controlled jointly by a piston which is exposed to the pressure fluid and by a spring;

a mounting structure mounting the cylinder on said assembly in a disposition with the piston rod across the direction of travel of the rack extension and establishing an axis transverse to the longitudinal reference axis of said rack extension; and a cam portion arranged with the diameter of the cam surface tapering downwardly from a relatively enlarged end;

said cam portion being carried by said piston rod and movable thereby in a direction to be engaged by and to stop the rack, respectively in a normal maximum power output position when the power demand of the hydraulic system becomes minimal, and in progressively increasing full-load power output positions when the power demand of the hydraulic system increases due to loading on the tractor-mounted tool.

2. The invention of claim 1, wherein said cylinder has a head end opposite to the piston rod end of the cylinder, the pressure fluid of said hydraulic system being communicated through the head end of the cylinder to the piston, in opposing relation to said spring, said tapering cam portion surface being arranged with its larger diameter at that end thereof remote to the cylinder, whereby in responding to minimal hydraulic power demand the piston rod retracts the cam portion surface so that it presents its enlarged end for engagement by the rack extension.

3. The invention of claim 1, wherein said mounting structure on said assembly comprises clamping means releasably holding said cylinder to afford adjustment thereof transversely to the direction of travel of the rack extension, whereby the normal limiting position of travel of the rack extension can be pre-selected for the normal maximum power output desired.

References Cited in the file of this patent

UNITED STATES PATENTS

| | | |
|---|---|---|
| 2,396,618 | Stieglitz | Mar. 12, 1946 |
| 2,986,291 | Schick | May 30, 1961 |